(12) United States Patent
Eshima

(10) Patent No.: US 6,434,321 B1
(45) Date of Patent: Aug. 13, 2002

(54) METHOD AND APPARATUS FOR SLOW-MOTION VIDEO AND AUDIO REPRODUCTION

(75) Inventor: Shigeo Eshima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/903,772

(22) Filed: Jul. 31, 1997

(30) Foreign Application Priority Data

Aug. 8, 1996 (JP) .............................................. 8-209751

(51) Int. Cl.⁷ .............................................. H04N 5/783
(52) U.S. Cl. .............................. 386/75; 386/96; 386/104
(58) Field of Search ................................ 386/4, 5, 6, 7, 386/68, 81, 82, 96, 104, 105, 75; 360/61, 64

(56) References Cited

U.S. PATENT DOCUMENTS

| | | | | |
|---|---|---|---|---|
| 4,723,176 A | * | 2/1988 | Ive ................................ 360/31 |
| 5,414,568 A | * | 5/1995 | Taki et al. ................. 360/73.05 |
| 5,471,239 A | * | 11/1995 | Hill et al. ..................... 348/155 |
| 5,604,603 A | * | 2/1997 | Yoshinaka et al. .......... 380/100 |
| 5,757,808 A | * | 5/1998 | Denissen et al. ............. 371/2.1 |
| 5,887,113 A | * | 3/1999 | Park et al. ..................... 386/81 |

FOREIGN PATENT DOCUMENTS

EP 0681398 11/1995

OTHER PUBLICATIONS

European Search Report dated May 3, 1999.

* cited by examiner

*Primary Examiner*—Thai Tran
(74) *Attorney, Agent, or Firm*—Stevens, Davis, Miller & Mosher, LLP

(57) ABSTRACT

To facilitate highly accurate editing with reference to the audio and to reduce the cost for facilitating highly accurate editing with reference to the audio, the following features are adopted: A slow-motion reproduction is enabled by reproducing video and audio signals recorded on a magnetic tape in a digital format at a speed lower than that of the normal reproduction and outputting a video signal of the same frame or field over a plurality of frame or field periods. An audio switching signal is generated in accordance with a variation in the video signal and the output of the audio signal is controlled in response to the audio switching signal, so that of the plurality of frame or field periods over which a video signal of the same frame or field is repetitively outputted, only during one frame or field period immediately after the video signal varies, the audio signal is outputted, and during the remaining frame or field periods, the output of the audio signal is stopped.

5 Claims, 6 Drawing Sheets

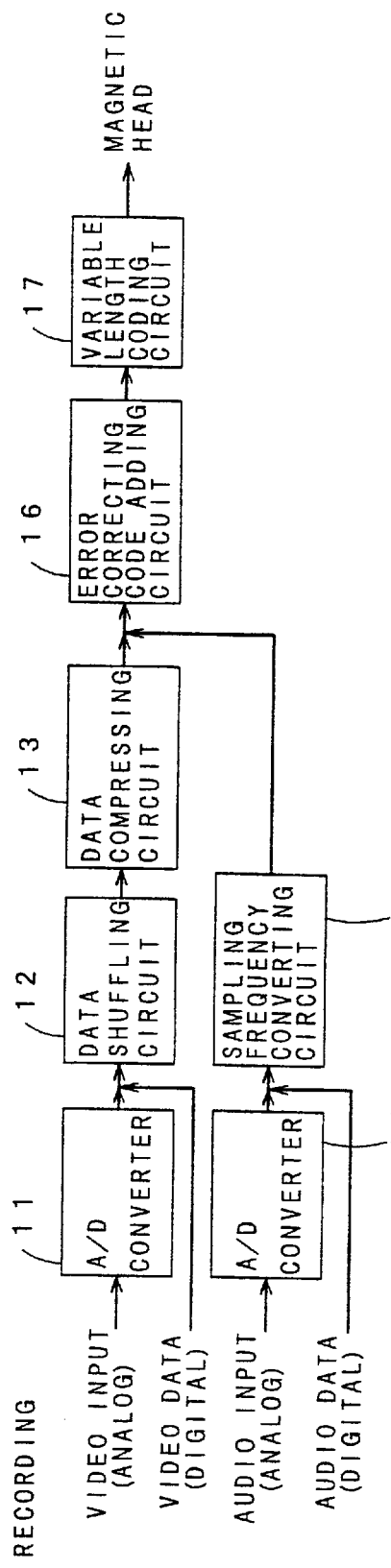
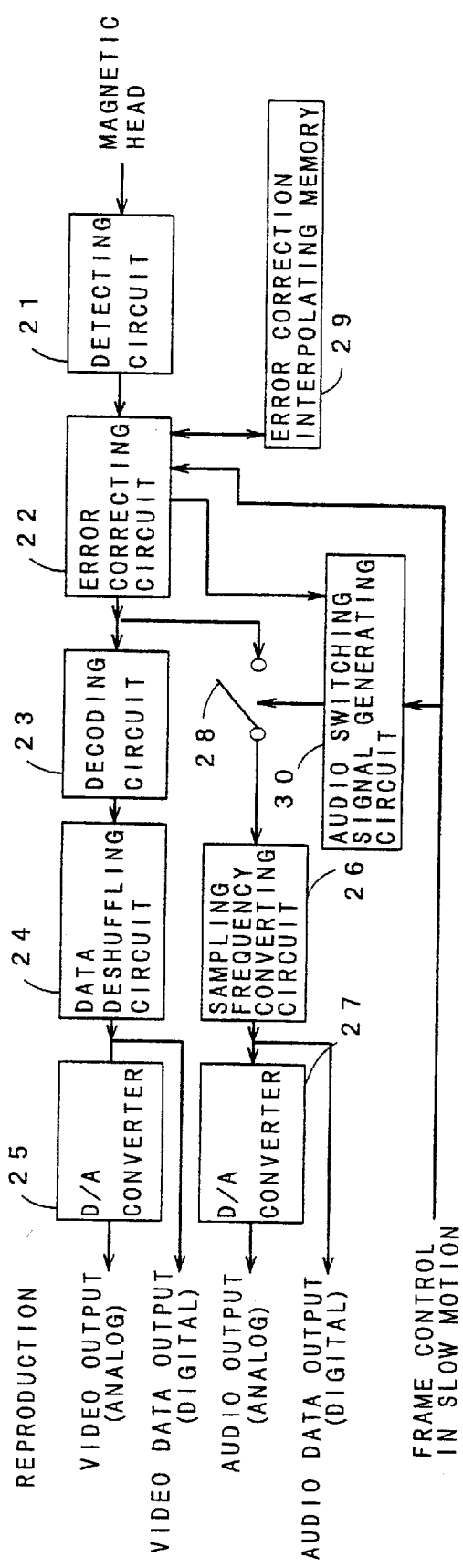
Fig. 1(a)
Fig. 1(b)

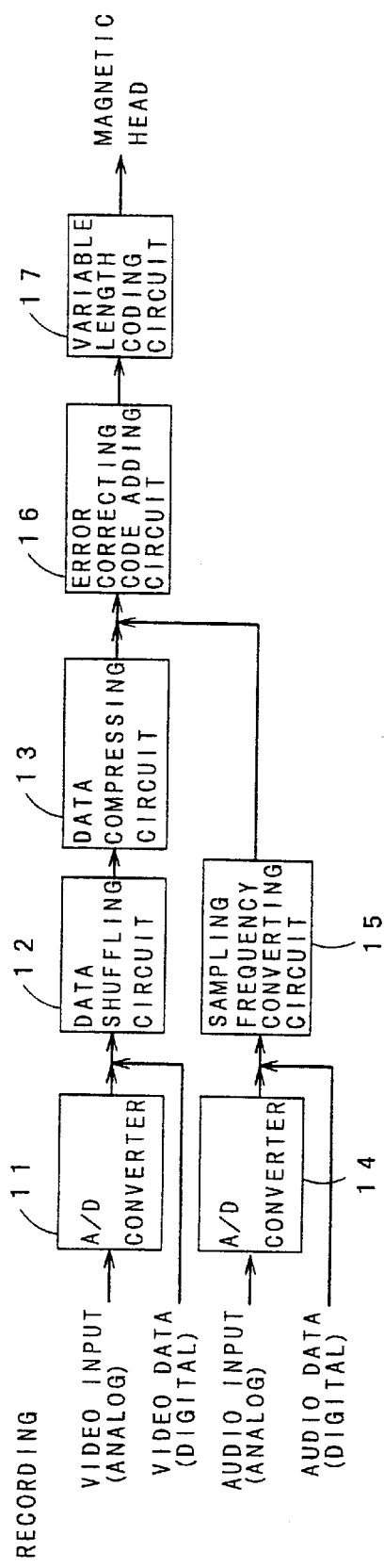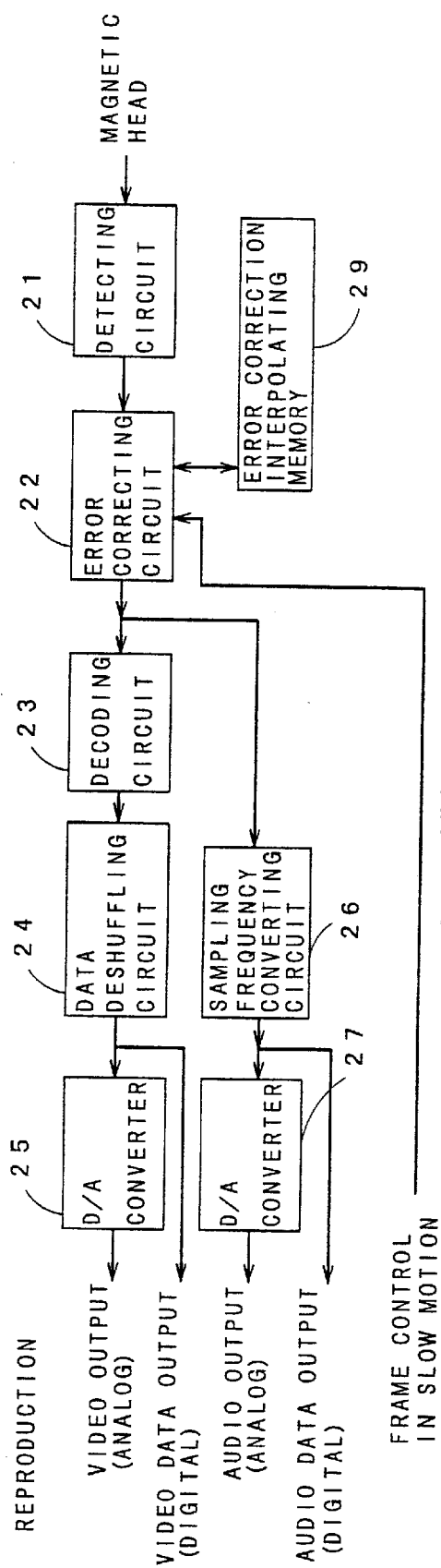

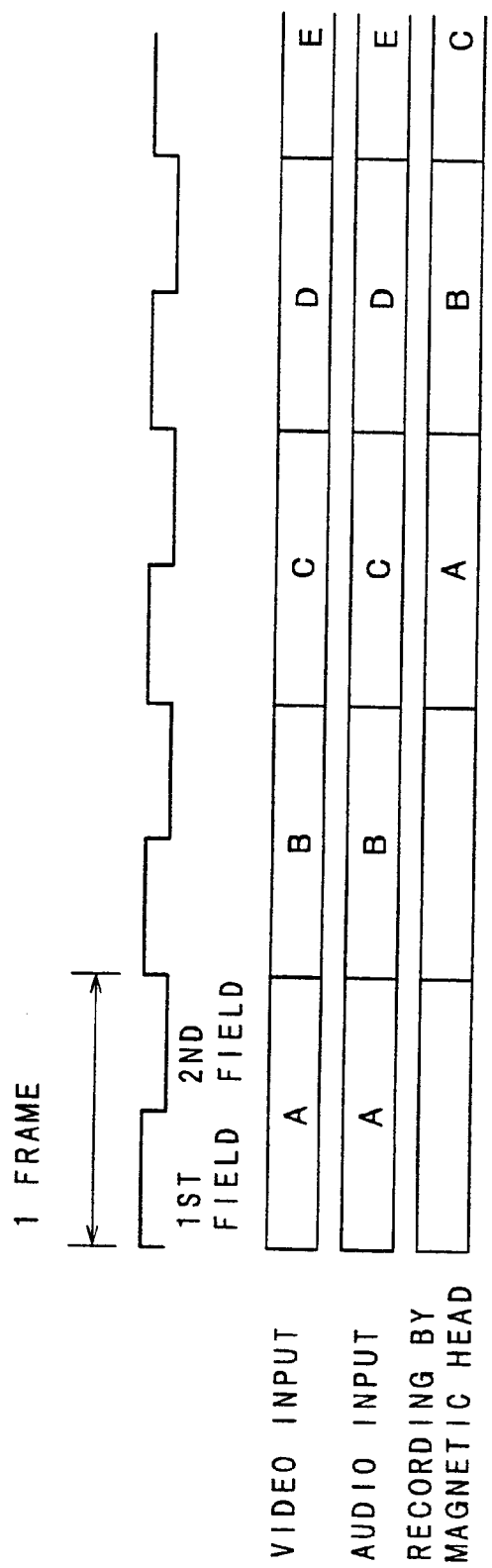

Fig. 6(a) NORMAL-SPEED REPRODUCTION
Fig. 6(b) 1/3-SPEED SLOW-MOTION REPRODUCTION
Fig. 6(c) 1/3-SPEED SLOW-MOTION REPRODUCTION

METHOD AND APPARATUS FOR SLOW-MOTION VIDEO AND AUDIO REPRODUCTION

BACKGROUND OF THE INVENTION

1. Field of the Invention

The present invention relates to a magnetic recording and reproducing method for slow-motion reproduction of video and audio signals recorded on a video tape of, for example, a DV (digital video) format and a magnetic recording and reproducing apparatus capable of slow-motion reproduction of the video and audio signals, said magnetic recording and reproducing apparatus being frequently incorporated in a laptop editor or installed as a part of studio editing equipment.

2. Description of the Prior Art

FIGS. 4(a) and 4(b) show block diagrams of a conventional magnetic recording and reproducing apparatus.

FIG. 4(a) is a block diagram of a recording system. FIG. 4(b) is a block diagram of a reproducing system.

Referring to FIG. 4(a), an A/D (analog-to-digital) converter 11 has a function to convert an analog video input from a television camera or other video tape recorders into a digital signal. A data shuffling circuit 12 has a function to selectively capture the output data from the A/D converter 11 and a digital video data input from a digital video tape recorder or a digital camera to perform data shuffling. A data compressing circuit 13 has a function to compress the output data of the data shuffling circuit 12 through two-dimensional discrete cosine transformation.

An A/D converter 14 has a function to convert an analog audio input from a microphone amplifier or other video tape recorders into a digital signal. A sampling frequency converting circuit 15 has a function to selectively capture the output data from the A/D converter 14 and a digital audio data input from a digital video tape recorder or other digital sound sources to perform sampling frequency conversion.

An error correcting code adding circuit 16 has a function to add an error correcting code to the output of the data compressing circuit 13 and the output of the sampling frequency converting circuit 15. A variable length coding circuit 17 has a function to code the output of the error correcting code adding circuit 16. The output of the variable length coding circuit 17 is sent to a magnetic head (not shown), so that the video and audio signals are recorded on a magnetic tape in frame units, for example, in the DV format.

Referring to FIG. 4(b), a detecting circuit 21 has a function to detect a signal outputted from the magnetic head (not shown) sliding over the magnetic tape. An error correcting circuit 22 has a function to perform error correction on the digital signal outputted from the detecting circuit 21. A decoding circuit 23 has a function to decode the video data included in the digital signal outputted from the error correcting circuit 22. A data deshuffling circuit 24 has a function to deshuffle the data outputted from the decoding circuit 23. The data deshuffling circuit 24 outputs digital video data which are used for digital dubbing.

A D/A (digital-to-analog) converter 25 has a function to convert the output data of the data deshuffling circuit 24 into an analog signal. The analog video output is sent to a video monitor or used for analog dubbing. To the error correcting circuit 22, a frame control signal in slow-motion reproduction is added to control the error correcting operation in slow-motion reproduction.

A sampling frequency converting circuit 26 has a function to perform sampling frequency conversion on the audio data included in the digital signal outputted from the error correcting circuit 22. The sampling frequency converting circuit 26 outputs digital audio data which are used for digital dubbing.

A D/A converter 27 has a function to convert the output data of the sampling frequency converting circuit 25 into an analog signal. The analog audio output is sent to an audio monitor or used for analog dubbing.

In the magnetic recording and reproducing apparatus shown in FIG. 4, in the case of the signal processing in recording, the video signal is delayed by a total of two frames: one frame in the data shuffling operation and one frame in the error correcting code adding operation, whereas the audio signal is delayed only by one frame in the error correcting code adding operation. For this reason, although not shown in the circuit of FIG. 4, a means for delaying the audio signal by one frame is provided in order to synchronize the recording timing of the video and audio signals.

Likewise, in the case of the signal processing in reproduction, the video signal is delayed by a total of two frames: one frame in the data deshuffling operation and one frame in the error correcting operation, whereas the audio signal is delayed only by one frame. For this reason, although not shown in the circuit of FIG. 4, a means for delaying the audio signal by one frame is provided in order to synchronize the reproduction timing of the video and audio signals. The signal processing is performed in frame units.

FIG. 5 shows the timing in the recording and reproduction of the video and audio signals. FIG. 5(a) shows the timing in recording. FIG. 5(b) shows the timing in normal reproduction (normal-speed reproduction). Reference characters A, B, C, D and E in the figures represent frames. FIG. 5(a) shows that when the video input and the audio input are added in synchronism with each other to the frames A, B, C, ..., the recording by the magnetic head is performed on the frames A, B, C, ... with a delay of two frames from the video and audio inputs. FIG. 5(b) shows that when the reproduction by the magnetic head is performed on the frames A, B, C, ..., the video output and the audio output are performed on the frames A, B, C, ... with a delay of two frames from the reproduction by the magnetic head.

The magnetic recording and reproducing apparatus is capable of a 1/n-speed slow-motion reproduction in which the average transport speed of the magnetic tape is 1/n that of the normal reproduction. Here, n is an integer not less than 2 but not more than approximately 30. In the 1/n-speed slow-motion reproduction, a slow-motion reproduction at a speed 1/n the normal reproduction speed is performed by reproducing video and audio signals recorded on a magnetic tape in a digital format such as the DV format at a speed 1/n that of the normal reproduction and repetitively outputting a video signal of the same frame over n frame periods. The magnetic recording and reproducing apparatus is also capable of a variable speed slow-motion reproduction in which the speed of the slow-motion reproduction is variable from ½ (n=2) to approximately 1/30 (n=30).

The repetitive output of a video signal of the same frame over n frame periods is realized by storing one frame of the data obtained by the error correcting circuit 22 in an error correction interpolating memory 29 and outputting the one frame of the data stored in the error correction interpolating memory 29 n times. When the magnetic tape is transported to reproduce the data of the next frame, the data in the error correction interpolating memory 29 are updated. The frame control in the slow-motion reproduction is performed based on a control signal (speed information) for sending the same signal n times.

Referring now to FIG. 6, there is shown a difference in video and audio signals between the normal-speed reproduction and a ⅓-speed reproduction. FIG. 6(a) shows the manner of the video output and the audio output in the normal-speed reproduction and indicates that the frames of the video and audio outputs are changed to A, B, C, . . . every frame period. FIG. 6(b) shows the manner of the video output and the audio output in the ⅓-speed reproduction and indicates that the frames of the video and audio outputs are changed to A, A, A, B, B, B, C, C, C, . . . every frame period, i.e. video and audio outputs of the same frame are repetitively outputted over three consecutive frame periods.

The above-described conventional magnetic recording and reproducing apparatus is capable of the 1/n-speed slow-motion reproduction in which the value of n is variable within a predetermined range, for example, for the purpose of editing, and in the 1/n-speed slow-motion reproduction, the audio is outputted together with the video. The reason why the audio as well as the video is outputted is that it is insufficient to perform editing only with reference to the video but it is necessary to perform editing with reference to the audio. For example, in editing video and audio signals representative of a reporter making a comment, it is necessary to accurately determine the start timing of the audio generated by the reporter while monitoring the video. This is because editing performed only with reference to the video can result in a trouble such that the beginning of the audio is missing.

However, when an audio signal of the same frame is repetitively outputted over a plurality of frame periods in the slow-motion reproduction, the waveform of the audio signal is changed to one completely different from the original waveform and since the same waveform is repetitively outputted, the audio is changed to one completely different from the audio in the normal reproduction. This makes the recognition of the audio difficult. Consequently, although the audio is also outputted in the slow-motion reproduction, it is not easy to perform editing while listening to the audio, for example, to determine the start point of the audio to cut the video and audio signals at the point and connect them to other portions, so that it is difficult to perform editing with high accuracy.

An audio signal processing method has already been proposed which solves the above-mentioned problem that outputting audio signals as they are in the slow-motion reproduction makes the recognition of the audio difficult. According to the method, for example, when a ⅓-speed slow-motion reproduction is performed, one frame of video signals are outputted three times, whereas for the audio signals, the time axis is tripled and one frame of audio signals are outputted once during three frame periods to synchronize the audio to the video reproduced in slow motion at a speed ⅓ the normal speed. Likewise, when a slow-motion reproduction in the reverse direction is performed, with the time axis being tripled and reversed, the audio is synchronized to the video reproduced in slow motion.

In the slow-motion reproduction in the reverse direction, since the order of the audio is reversed, it is necessary to temporarily store the audio in the memory and read it out in reverse order. This is because in the slow motion reproduction in the reverse direction, the reproduced audio is not reversed since the rotation direction of the cylinder is the same although the transport direction of the tape is reversed. Therefore, it is necessary to reproduce the audio in the reverse direction by storing the audio in the memory and reading it out in reverse order.

According to the time axis extending method, although the frequency of the outputted audio decreases, the waveform is substantially similar to that of the audio signal in the normal reproduction, so that the audio is easily recognized. Consequently, the editing with reference to the audio is facilitated.

However, to perform the time axis extending operation or the time axis reversing operation of the audio signal, a time corresponding to at least one frame is necessary. For this reason, when the slow-motion reproduction is performed, the audio lags behind the video. This causes a non-synchronism between the video and the audio. When editing is performed in accordance with a time code at a splice of the video which time code is read based on the timing of the audio while the editor is listening to the audio, since the editing is performed with the video and the audio not being synchronized, the start point of the audio differs from an intended timing. Because of the non-synchronism and the difference in timing, editing cannot accurately be performed. In addition, since the time axis extending operation or the time axis reversing operation of the audio is performed, the circuit structure is complicated, so that the cost increases.

Another possible method is to record the audio on a cue track in an analog format and perform editing while reproducing the audio on the cue track. According to this method, however, to synchronize the audio to the reproduced video signal recorded in a digital format, for example, it is necessary to provide an analog delay element for delaying the audio by the time corresponding to one frame. For example, in the ⅓ slow-motion reproduction, it is necessary to provide an analog delay element for ensuring a delay time three times that of the normal reproduction. Consequently, the number of analog delay elements is great and the cost increases accordingly. Thus, it is difficult to handle the slow-motion reproduction with the analog audio.

SUMMARY OF THE INVENTION

Accordingly, an object of the present invention is to provide a magnetic recording and reproducing method and a magnetic recording and reproducing apparatus facilitating editing with reference to the audio and enabling the editing to be performed with high accuracy.

Another object of the present invention is to provide a magnetic recording and reproducing method and a magnetic recording and reproducing apparatus capable of reducing the cost for facilitating the editing with reference to the audio.

According to a magnetic recording and reproducing method of the present invention, in performing a slow-motion reproduction by reproducing video and audio signals recorded on a magnetic tape in a digital format at a speed lower than a speed of a normal reproduction and repetitively outputting a video signal of the same frame or field over a plurality of frame or field periods, the audio signal is outputted only during a part of the plurality of frame or field periods over which a video signal of the same frame or field is repetitively outputted, and during the remaining part of the frame or field periods, the output of the audio signal is stopped. In this case, it is preferable for editing that the audio signal be outputted only during one frame or field period immediately after the video signal varies. The speed of the slow-motion reproduction ranges from ½ to 1/30 the speed of the normal reproduction.

According to this method, the recognition of the audio is facilitated in the slow-motion reproduction and since there is no time lag between the video and the audio, non-synchronism is not caused between the video and the audio. In addition, when editing is performed in accordance with a time code at a splice of the video which time code is read based on the timing of the audio while the editor is listening to the audio, since editing is performed with the video and the audio being in synchronism with each other, editing is accurately performed.

A magnetic recording and reproducing apparatus of the present invention is capable of performing a slow-motion reproduction by reproducing video and audio signals recorded on a magnetic tape in a digital format at a speed lower than a speed of a normal reproduction and repetitively outputting a video signal of the same frame or field over a plurality of frame or field periods, and switching means for controlling the output of the audio signal in response to an audio switching signal outputted in accordance with a variation in the video signal is provided so that of the plurality of frame or field periods over which a video signal of the same frame or field is repetitively outputted, only during one frame or field period immediately after the video signal varies, the audio signal is outputted, and during the remaining frame or field periods, the output of the audio signal is stopped.

According to this feature, the recognition of the audio is facilitated in the slow-motion reproduction and since there is no time lag between the video and the audio, non-synchronism is not caused between the video and the audio. When editing is performed in accordance with a time code at a splice of the video which time code is read based on the timing of the audio while the editor is listening to the audio, since editing is performed with the video and the audio being in synchronism with each other, editing is accurately performed. In addition, since only the switching means for controlling the output of the audio signal in response to the audio switching signal outputted in accordance with a variation in the video signal is necessarily added for that purpose, the cost hardly increases.

BRIEF DESCRIPTION OF THE DRAWINGS

FIGS. 1(a) and 1(b) show block diagrams of the structure of a recording system and a reproducing system of a magnetic recording and reproducing apparatus according to a first embodiment of the present invention;

FIGS. 4(a) and 4(b) show block diagrams of the structure of a recording system and a reproducing system of a conventional magnetic recording and reproducing apparatus;

FIGS. 5(a) and 5(b) show a timing chart of the video input, the audio input and the recording by a magnetic head and a timing chart of the reproduction by the magnetic head, the video output and the audio output in the magnetic recording and reproducing apparatus of FIGS. 4(a) and 4(b); and FIGS. 6(a), 6(b) and 6(c) show the manners of the video output and the audio output in the normal reproduction, and in a ⅓-speed reproduction in the prior art and in the embodiments of the present invention.

DESCRIPTION OF THE PREFERRED EMBODIMENTS

Figure 2:
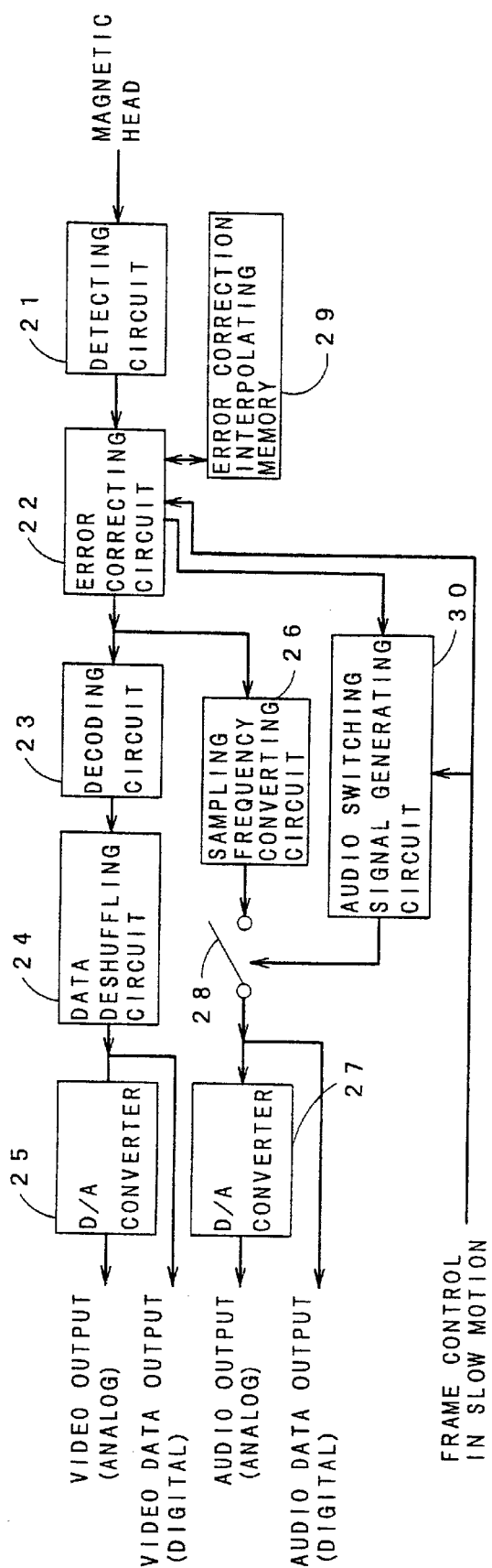
FIG. 2 shows a block diagram of the structure of a reproducing system of a magnetic recording and reproducing apparatus according to a second embodiment of the present invention.

Hereinafter, embodiments of the present invention will be described with reference to the drawings.

FIRST EMBODIMENT

FIGS. 1(a) and 1(b) are block diagrams of a magnetic recording and reproducing apparatus according to a first embodiment of the present invention. FIG. 1(a) is a block diagram of a recording system. FIG. 1(b) is a block diagram of a reproducing system. The recording system shown in FIG. 1(a) is the same as that shown in FIG. 4(a). The reproducing system shown in FIG. 1(b) is the same as that shown in FIG. 4(b) except that a switching means 28 is added.

Like the conventional magnetic recording and reproducing apparatus, this embodiment is capable of slow-motion reproduction by reproducing video and audio signals recorded on a magnetic tape in a digital format at a speed lower than that of the normal reproduction and repetitively outputting a video signal of the same frame over a plurality of frame periods. As shown in FIG. 1(b), the switching means 28 for controlling the output of the audio signal in response to an audio switching signal outputted in accordance with a variation in the video signal is provided on the input side of the sampling frequency converting circuit 26 so that the supply of the audio data to the sampling frequency converting circuit 26 is intermittent. Consequently, of the plurality of frame periods over which a video signal of the same frame is repetitively outputted, only during one frame period immediately after the video signal varies, the audio signal is outputted, and during the remaining frame periods, the output of the audio signal is stopped.

The audio switching signal is generated by an audio switching signal generating circuit 30. The audio switching signal generating circuit 30 recognizes that new one frame of signals are captured based on the output signal of the error correcting circuit 22 and determines during which frame period of the frame periods over which the video signal is outputted n times the audio signal is outputted based on the slow-motion reproduction control signal, thereby generating the audio switching signal.

FIG. 6(c) shows the manner of the video output and the audio output in this embodiment. FIG. 6(c) shows the video output and the audio output in the ⅓-speed reproduction and indicates that the frame of the video output is changed to A, A, A, B, B, B, C, C, C, . . . every frame period, i.e. a video signal of the same frame is repetitively outputted during three consecutive frame periods, whereas the audio signal is outputted every three frames, i.e. the frame of the audio output is changed to A, -, -, B, -, -, C, -, -, . . . Here, "-" represents that the audio is not outputted.

According to this embodiment, when a video signal of the same frame is repetitively outputted over a plurality of frame periods, the audio signal is outputted only during the first one frame period of the plurality of the frame periods, so that the recognition of the audio is facilitated in the slow-motion reproduction and since there is no time lag between the audio and the video, non-synchronism is not caused between the video and the audio. When editing is performed in accordance with a time code at a splice of the video which time code is read based on the timing of the audio while the editor is listening to the audio, since editing is performed with the video and the audio being in synchronism with each other, editing is accurately performed. In addition, since only the switching means 28 for controlling the output of the audio signal in response to the audio switching signal outputted in accordance with a variation in the video signal is necessarily added for that purpose, the cost hardly increases.

SECOND EMBODIMENT

FIG. 2 shows a block diagram of a reproducing system of a magnetic recording and reproducing apparatus according to a second embodiment of the present invention. The recording system is the same as that of FIG. 4(a). The reproducing system is the same as that of FIG. 1(b) except that the switching means 28 is inserted in a different position.

In this embodiment, as shown in FIG. 2, the switching means 28 having the same function as that of the first embodiment is provided on the output side of the sampling frequency converting circuit 26 and at the front of the point where the audio data are outputted to the outside.

Moreover, as shown in FIG. 2, the switching means 28 for controlling the output of the audio signal in response to the audio switching signal outputted in accordance with a variation in the video signal is provided on the output side of the sampling frequency converting circuit 26 and at the front of the point where the audio data are outputted to the outside so that the supply of the audio data from the sampling frequency converting circuit 26 to the D/A converter 27 and the supply of the audio data to an external video tape recorder and the like are intermittent. Consequently, of the plurality of frame periods over which a video signal of the same frame is repetitively outputted, only during one frame period immediately after the video signal varies, the audio signal is outputted, and during the remaining frame periods, the output of the audio signal is stopped.

This embodiment produces the same advantages as the first embodiment.

THIRD EMBODIMENT

Figure 3:
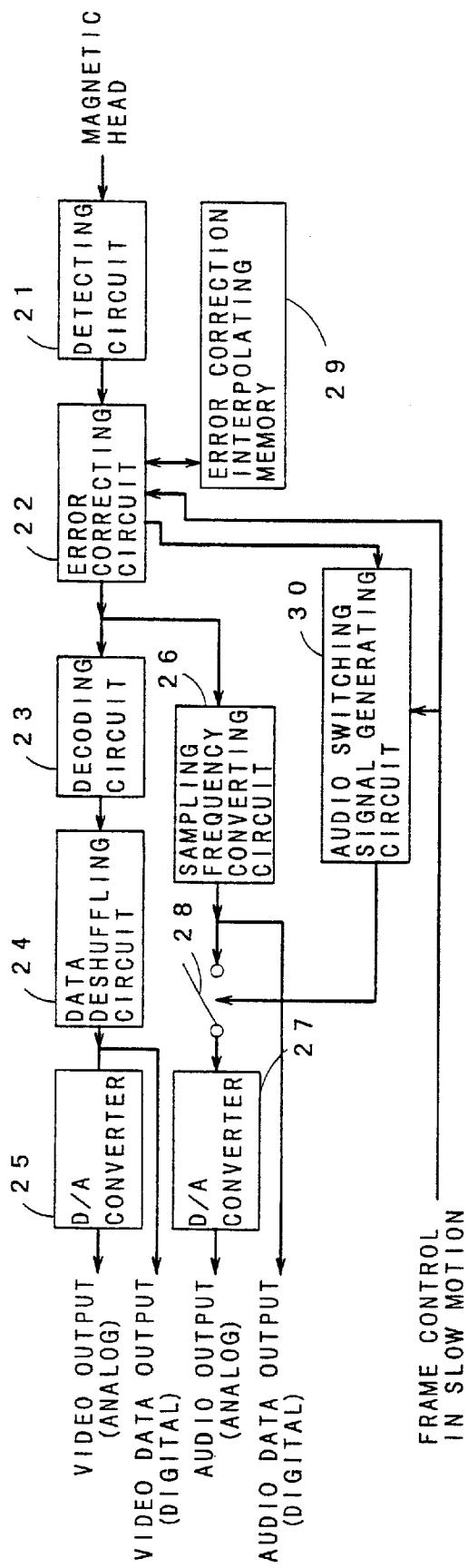
FIG. 3 shows a block diagram of the structure of a reproducing system of a magnetic recording and reproducing apparatus according to a third embodiment of the present invention.

FIG. 3 shows a block diagram of a reproducing system of a magnetic recording and reproducing apparatus according to a third embodiment of the present invention. The recording system is the same as that of FIG. 4(a). The reproducing system is the same as that of FIG. 1(b) except that the switching means 28 is inserted in a different position.

In this embodiment, as shown in FIG. 3, the switching means 28 having the same function as that of the first embodiment is provided on the output side of the sampling frequency converting circuit 26 and at the rear of the point where the audio data are outputted to the outside.

As shown in FIG. 3, the switching means 28 for controlling the output of the audio signal in response to the audio switching signal outputted in accordance with a variation in the video signal is provided on the output side of the sampling frequency converting circuit 26 and at the rear of the point where the audio data are outputted to the outside so that the supply of the audio data from the sampling frequency converting circuit 26 to the D/A converter 27 is intermittent. Consequently, of the plurality of frame periods over which a video signal of the same frame is repetitively outputted, only during one frame period immediately after the video signal varies, the audio signal is outputted, and during the remaining frame periods, the output of the audio signal is stopped. The supply of the audio data to an external video tape recorder and the like is performed in a similar manner to that of the conventional apparatus.

This embodiment produces the same advantages as the first embodiment.

While in the above-described embodiments, in the slow-motion reproduction, the audio signal is outputted only during the first one frame period of the plurality of frame periods over which a video signal of the same frame is outputted and the output of the audio signal is stopped during the remaining frame periods, the audio may be outputted over two or more frame periods. Alternatively, the audio signal may be outputted during the second and succeeding frame periods.

In these embodiments, to facilitate the recognition of the audio in the slow-motion reproduction, the audio signal is outputted only during the first one frame period of the plurality of frame periods over which a video signal of the same frame is outputted irrespective of the speed of the slow-motion reproduction. However, it is considered that, when the speed of the slow-motion reproduction is high to a degree, the discontinuity of the audio caused by the thinning out of the audio signal is more conspicuous than the non-synchronism caused by the time lag between the video and the audio associated with the time axis extending operation and the time axis reversing operation. Therefore, the audio may be outputted in such a manner that when the speed of the slow-motion reproduction is low, i.e. when the value of n is high, the audio is thinned out (the audio is outputted only during one frame period and the audio is not outputted during the remaining frame periods) and when the speed of the slow-motion reproduction is high to a degree to be close to the speed of the normal reproduction, the audio produced by the time axis extending operation or the time axis reversing operation is outputted.

While the above description of the embodiments is given with respect to the slow-motion reproduction in which a video signal of the same frame is repetitively outputted over a plurality of frame periods, the present invention may be similarly applied to a slow-motion reproduction in which a video signal of the same field is repetitively outputted over a plurality of field periods.

What is claimed is:

1. A magnetic recording and reproducing method for performing a slow-motion reproduction, said method comprising the steps of:

(a) reproducing video and audio signals recorded on a magnetic tape in a digital format at a slow-motion reproduction speed which is lower than a speed of a normal reproduction;

(b) repetitively outputting a video signal of a same frame or field over a plurality of frame or field periods; and (c) controlling output of an audio signal by (i) providing output of said audio signal only during a part of the plurality of frame or field periods over which a video signal of the same frame or field is being repetitively outputted, and (ii) preventing output of said audio signal during a remaining part of the plurality of frame or field periods.

2. A magnetic recording and reproducing method according to claim 1, wherein the audio signal is outputted only during one frame or field period immediately after the video signal varies.

3. A magnetic recording and reproducing method according to claim 1, wherein the slow-motion reproduction speed ranges from ½ to 1/30 the speed of the normal reproduction.

4. A magnetic recording and reproducing apparatus for performing a slow-motion reproduction of video and audio signals recorded on a magnetic tape in a digital format at a slow-motion reproduction speed lower than a speed of a normal reproduction, said apparatus comprising:

means for repetitively outputting a video signal of a same frame or field over a plurality of frame or field periods, means for generating an audio switching signal in accordance with a variation in said video signal, and switching means for controlling output of an audio signal in response to said audio switching signal by (i) providing output of said audio signal only during one frame or field period of said plurality of frame or field periods over which a video signal of the same frame or field is being repetitively outputted, said one frame or field period being immediately after said audio switching signal is generated after said video signal varies and (ii) preventing output of said audio signal during a remaining part of the plurality of frame or field periods.

5. A magnetic recording and reproducing apparatus according to claim 4, wherein the slow-motion reproduction speed ranges from ½ to 1/30 the speed of the normal reproduction.

* * * * *